(12) United States Patent
Zonabend

(10) Patent No.: US 10,255,368 B2
(45) Date of Patent: Apr. 9, 2019

(54) COMBINATORIAL MATCHING TECHNIQUES FOR ELECTRONIC DATA MESSAGES

(71) Applicant: Nasdaq Technology AB, Stockholm (SE)

(72) Inventor: Simon Karl Zonabend, Stockholm (SE)

(73) Assignee: NASDAQ TECHNOLOGY AB, Stockholm (SE)

( * ) Notice: Subject to any disclaimer, the term of this patent is extended or adjusted under 35 U.S.C. 154(b) by 335 days.

(21) Appl. No.: 15/072,596

(22) Filed: Mar. 17, 2016

(65) Prior Publication Data
US 2016/0283599 A1    Sep. 29, 2016

Related U.S. Application Data

(60) Provisional application No. 62/134,906, filed on Mar. 18, 2015.

(51) Int. Cl.
*G06F 17/30*    (2006.01)
*G06Q 10/08*    (2012.01)
*G06Q 40/04*    (2012.01)

(52) U.S. Cl.
CPC ..... *G06F 17/30867* (2013.01); *G06Q 10/087* (2013.01); *G06Q 40/04* (2013.01)

(58) Field of Classification Search
CPC . G06F 17/30867; G06Q 10/087; G06Q 40/04
USPC ........................................................ 707/722
See application file for complete search history.

(56) References Cited

U.S. PATENT DOCUMENTS

| | | | | |
|---|---|---|---|---|
| 7,966,249 B1* | 6/2011 | Dawson | ................ | G06Q 30/08 705/1.1 |
| 2010/0174654 A1* | 7/2010 | Foley | ..................... | G06Q 40/04 705/80 |
| 2011/0264577 A1 | 10/2011 | Winbom et al. | | |
| 2014/0297504 A1 | 10/2014 | Bergenudd et al. | | |
| 2015/0026033 A1* | 1/2015 | Curran | .................. | G06Q 40/04 705/37 |

(Continued)

OTHER PUBLICATIONS

Written Opinion issued in Application No. PCT/EP2016/056062 dated May 4, 2016 (8 pages).

(Continued)

*Primary Examiner* — Evan Aspinwall
(74) *Attorney, Agent, or Firm* — Nixon & Vanderhye P.C.

(57) ABSTRACT

A computer system includes a memory that stores two lists of electronic data transaction requests. Stored and received data transaction requests are associated with a size value and a counter-size requirement value. When data transaction requests are received they are added to one of the two lists and list to which the data transaction request is added is set to a working side. A working order is selected from the working side and a first sum of size values of data transaction requests is calculated from the working side. A second sum of size values is calculated from the non-working side from data transaction requests that have a counter-size requirement value that is less than the first sum. If the counter-size requirement value is less than or equal to the second sum, the electronic data requests from the respective lists are matched.

20 Claims, 5 Drawing Sheets

(56) References Cited

U.S. PATENT DOCUMENTS

| | | | | |
|---|---|---|---|---|
| 2015/0127520 A1* | 5/2015 | Farnstrom | ............... | G06Q 40/04 705/37 |
| 2016/0005117 A1* | 1/2016 | Scheerer | ................ | G06Q 40/04 705/37 |
| 2016/0019644 A1* | 1/2016 | Boudreault | ............ | G06Q 40/04 705/37 |
| 2016/0092985 A1* | 3/2016 | Shontz | ................... | G06Q 40/04 705/37 |

OTHER PUBLICATIONS

International Search Report issued in Application No. PCT/EP2016/056062 dated May 4, 2016 (5 pages).
Ben Van Vliet, "Networking for Quants and Traders," htpp://www.benvanvliet.net/downloads/networkingforquantsandtraders.pdf, Oct. 26, 2009 (20 pages).
"The Key Technology Decisions 1.0," Institute for Market Technology, www.i4mt.org, Oct. 11, 2007 (12 pages).
Ian Domowitz, "A Toxonomy of Automated Trade Execution Systems," Journal of International Money and Finance, vol. 12, Jan. 1, 1993 (26 pages).

* cited by examiner

COMBINATORIAL MATCHING TECHNIQUES FOR ELECTRONIC DATA MESSAGES

CROSS REFERENCE TO RELATED APPLICATION(S)

This application claims the benefit of U.S. Patent Application No. 62/134,906 filed Mar. 18, 2015, the entire contents of which are incorporated herein by reference.

TECHNICAL OVERVIEW

The technology herein relates to automated computing systems that match electronic data messages. More particularly, the technology herein relates to optimization techniques (including combinatorial optimization techniques) for how electronic data messages are matched.

INTRODUCTION

In computing technology, the speed at which a process is completed can depend on the speed or amount of processing resources (e.g., amount of memory used, amount of time with a CPU, the speed of the CPU, the number of CPUs, etc. . . . ) devoted to the process and the efficiency by which the process uses those processing resources. While increasing the amount of processing resources may be one solution (e.g., just use more computers), it may not always be possible, feasible, or desirable. Accordingly, new techniques for optimizing how the processing resources are allocated or used are sought after.

Such optimizations can be applied to many different areas of computing technology. For example, resource optimization may relate to how a file system on a computer should be arranged. A first computer process may use a first technique for organizing a file system and second computer process may use a second technique. While these two processes may nominally achieve the same result (e.g., an organized file system), they may achieve those results at different speeds (e.g., one may be faster than the other) and/or may use different amounts of the physical storage to achieve that result (e.g., storing 10 files with one technique may take twice as much disk space as the other technique).

Resource optimization may also be of interest in database query processing where the order of operations for a database query are optimized by a query parser. Such optimizations may be determined based on different characteristics of the query and/or database such that two queries that retrieve the same results may nonetheless be optimized differently (e.g., one being faster than the other).

In another area of computing technology, automated computer exchange systems often handle millions or billions of electronic data messages and transactions between those electronic data messages in a single day. Because of the volume and speed at which the electronic data messages are processed and/or executed, there are many computationally intensive tasks (e.g., search processes, match determination processes, communication processes, etc. . . . ) that must be performed quickly and accurately. And as with other areas of computing technology where resource optimization and allocation is a concern, it is not always possible, feasible, or desirable to deploy increased processing resources to achieve a desired performance level.

Accordingly, in these, and other areas of computing technology, new techniques for more efficient or optimized resource allocation are continually sought after. In particular, techniques for how the processes performed by an automated computer exchange may be optimized (e.g., to improve speed and/or efficiency) or how the processing resources of such systems may be allocated are continually sought after.

SUMMARY

In certain example embodiments, an incoming electronic data message (or a data transaction request included therein) is stored in an ordered list in electronic memory of a computer system. The list for which the new message is added is set as the "aggressive" or "working" list and the first (e.g., top of the list) message in that list is set as the aggressive or working electronic data message. A sum of values of data fields (e.g. the size field of each message) of the electronic data messages on the aggressive list is calculated. With this sum, a matching process iterates over another list (e.g., a "passive" list). During the iteration, electronic messages with a value greater than the value of the same data field in the aggressive data message are skipped. For example, electronic data messages with a size value that is greater than the size value of the aggressive order are skipped. A sum is calculated from the remaining electronic data message on the passive list.

Once the sum of the passive or non-working list is calculated, the process determines if the minimum requirement (e.g., another data field) of the aggressive electronic message is greater than the sum of the passive list. When the minimum requirement is greater, the matching process selected the next electronic message in the aggressive list and repeats the process. When the minimum requirement is less than or equal to the sum, the matching process will proceed to match messages from the passive list, in sorted order, against the current aggressive electronic data message.

The features described herein may be combined to form additional embodiments and sub-elements of certain embodiments may form yet further embodiments.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which.

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

In certain example embodiments, a computer system is a computer-implemented trading exchange system (exchange) that stores two sorted lists of received electronic data messages. The exchange is programmed to match messages from one of the lists against messages from the other list. Certain example techniques described herein are presented in the context of a computer-implemented exchange system that receives and matches orders (e.g., electronic data messages or data transaction requests).

Figure 1:
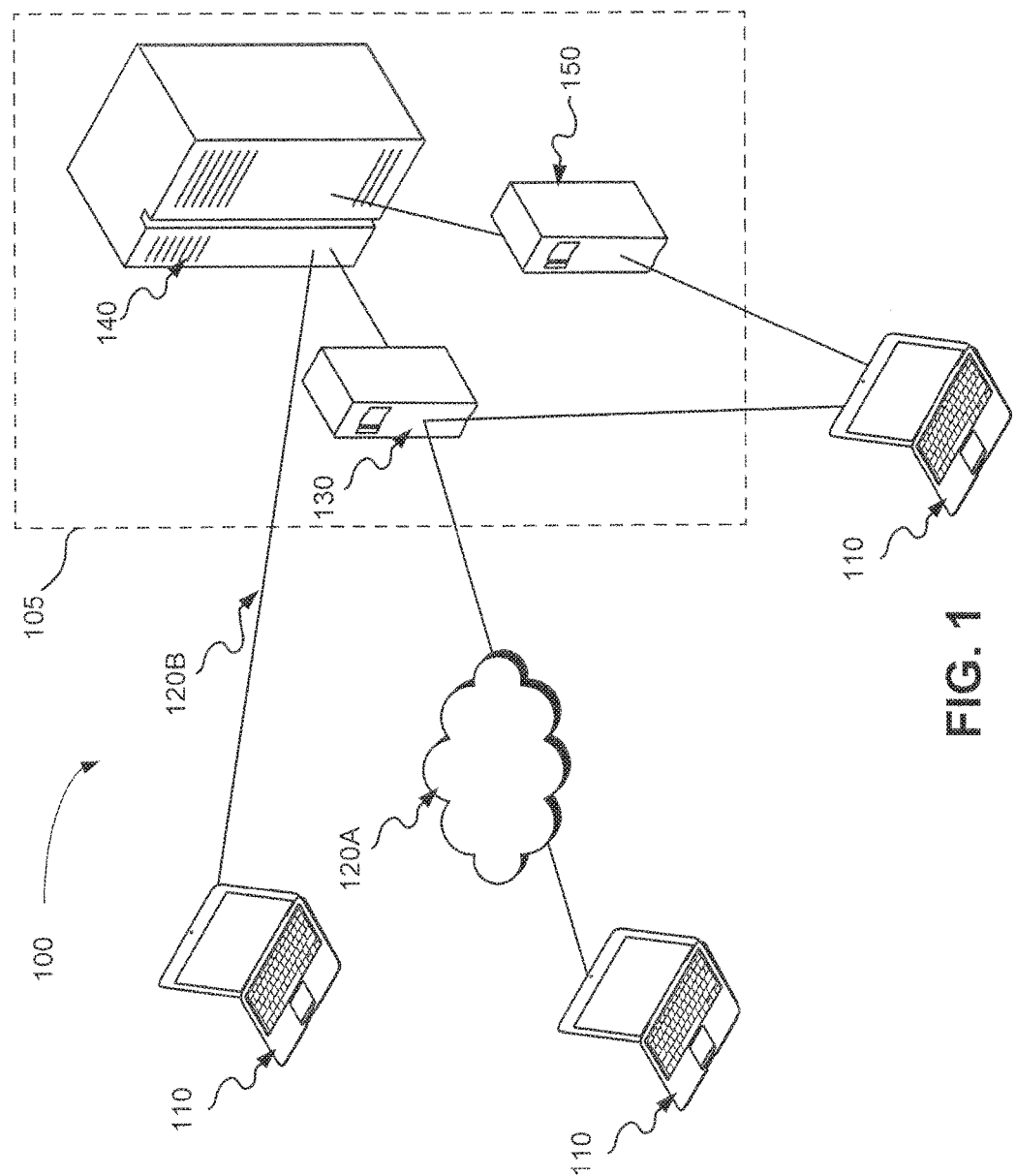
FIG. 1 illustrates a non-limiting example function block diagram of a computer-implemented exchange system coupled via a network to a client system configured to create and place orders with the exchange.
Figure 2:
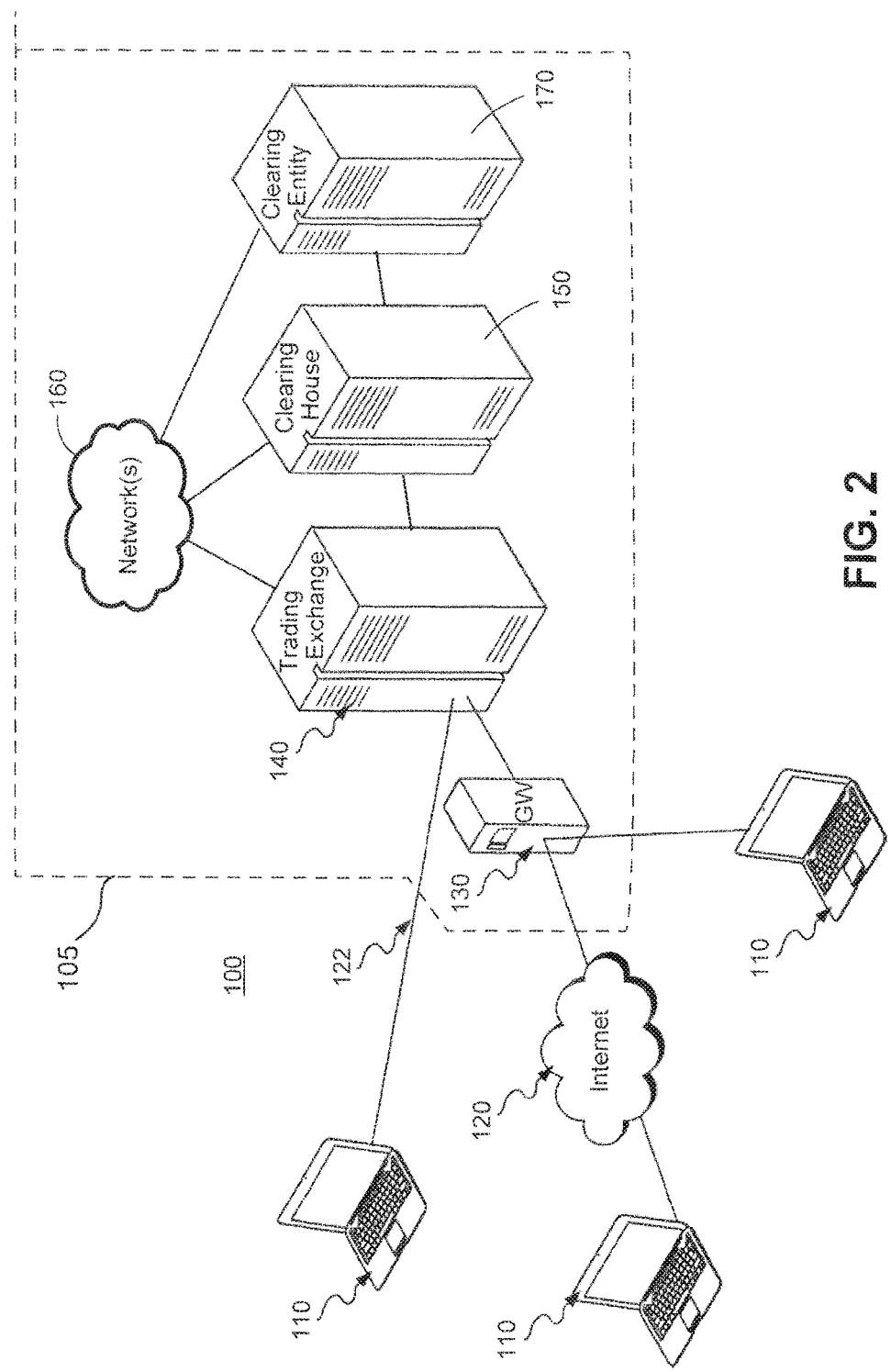
FIG. 2 illustrates a further expanded view of the block diagram of FIG. 1.
Figure 3:
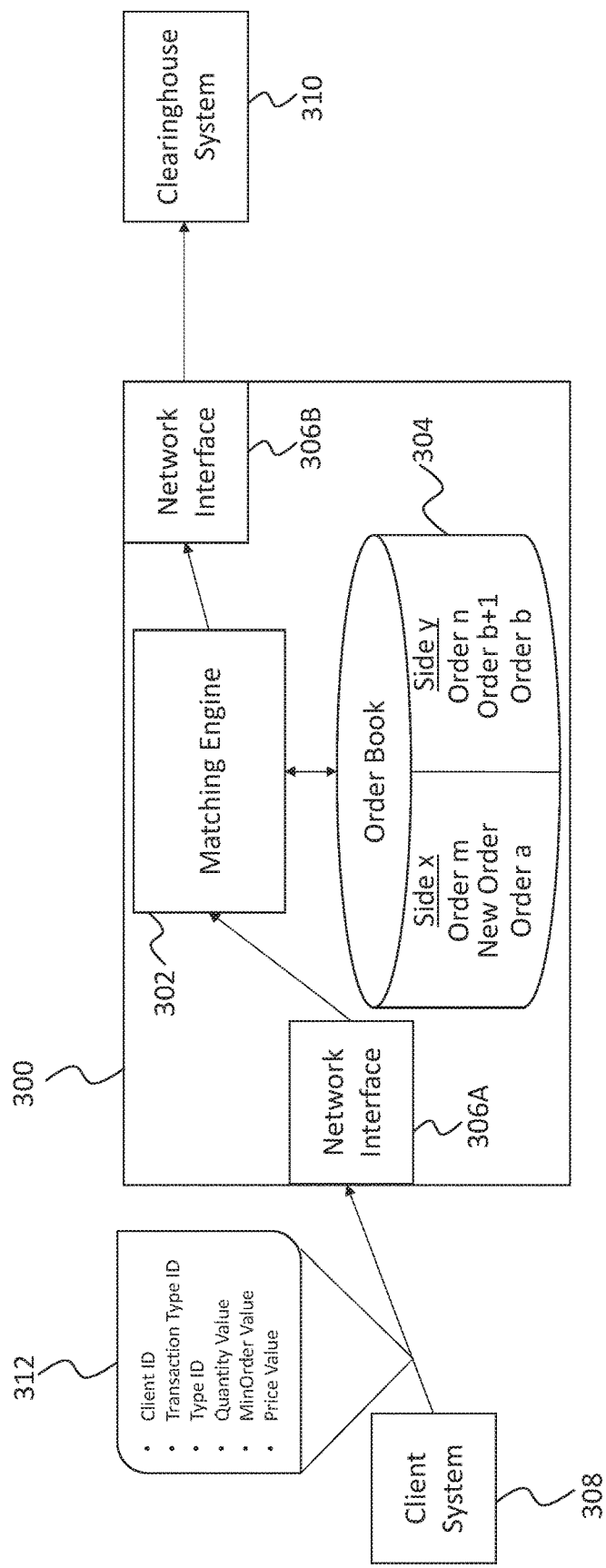
FIG. 3 is an example matching engine and order book implemented on a computing system according to certain example embodiments.
Figure 4:
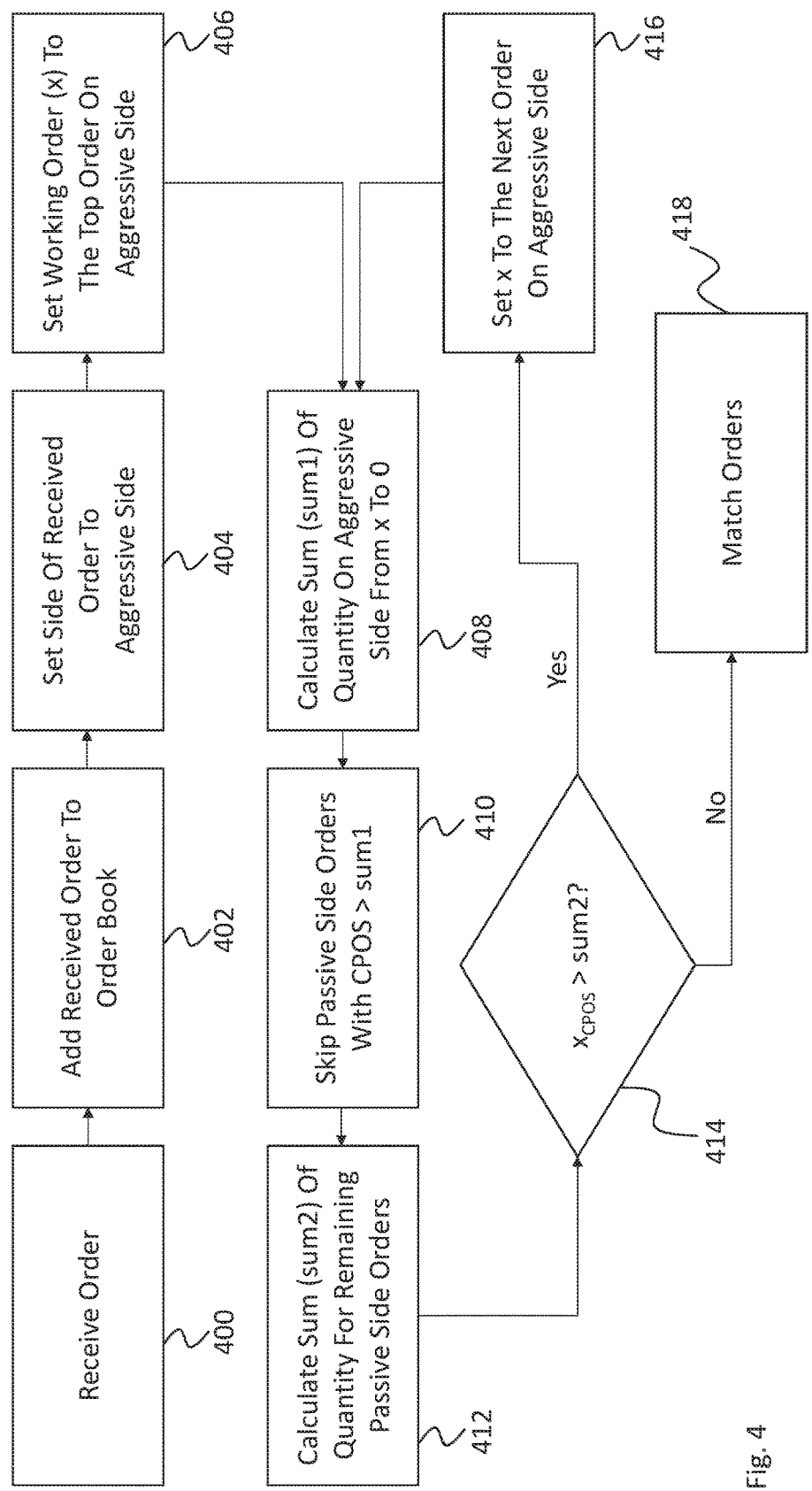
FIG. 4 is a flow chart of an example matching process that may be implemented according to certain example embodiments.
Figure 5:
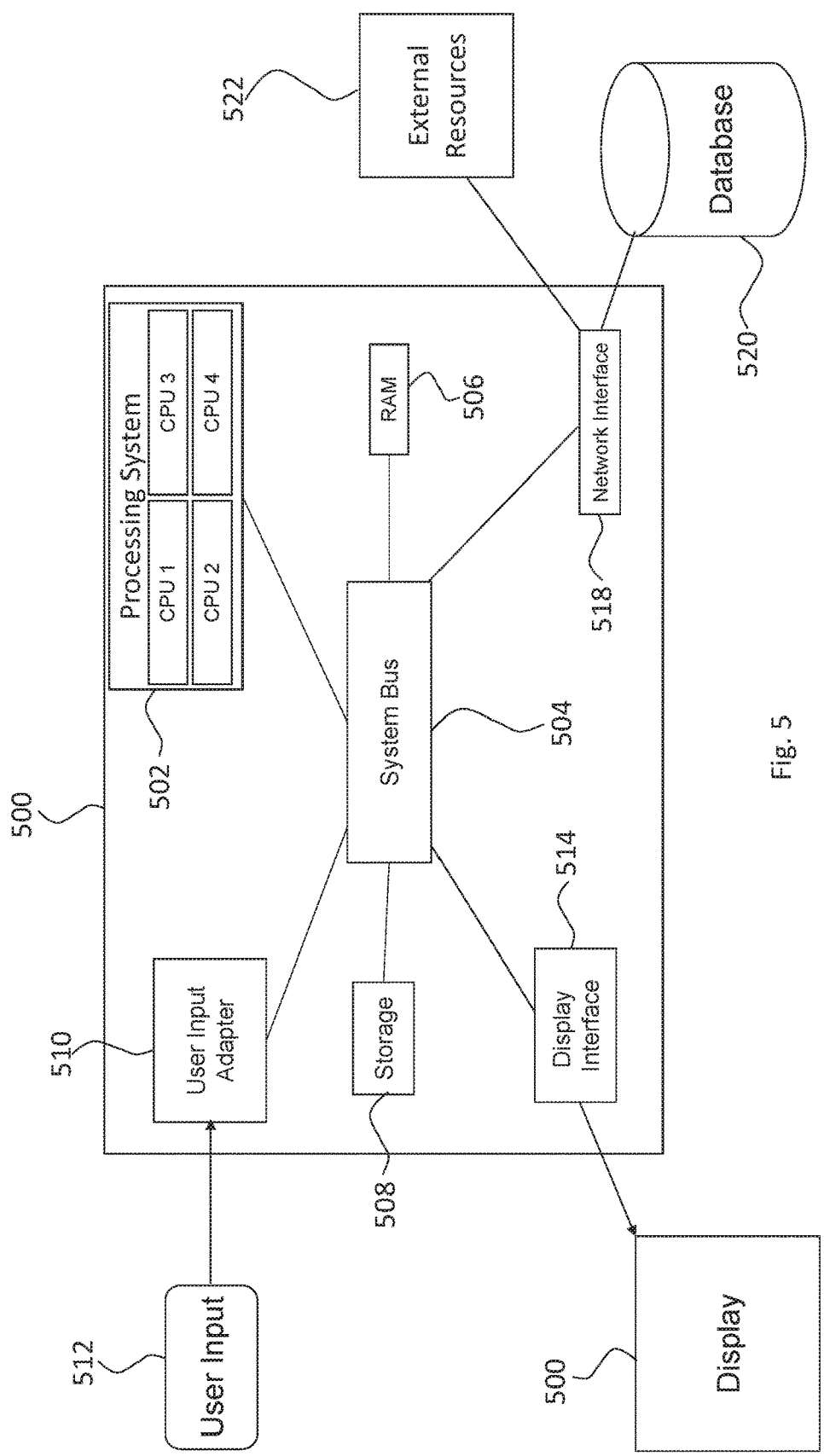
FIG. 5 is an example computer system according to certain example embodiments.

FIG. 1 illustrates a non-limiting example function block diagram of a computer-implemented exchange system coupled via a network to a client system configured to create and place orders with the exchange. FIG. 2 shows an expanded view of the block diagram of FIG. 1 and FIG. 3 shows an example matching engine computer system that may be part of the system shown in FIG. 1. FIG. 4 shows an example matching process that is performed, in some embodiments, in the system shown in FIG. 1, FIG. 2, and FIG. 3. FIG. 5 shows an example hardware architecture used, in some embodiments, to implement the features shown in FIG. 1 through FIG. 4.

FIG. 1

By way of introduction, FIG. 1 shows a block diagram of an example embodiment of a computer-implemented trading exchange system that includes client systems configured to create and place orders with an electronic exchange platform. A trading system 100 includes client systems 110 that can be implemented using a personal computer, PDA device, cell phone, server computer, or any other system/device configured to electronically communicate with the electronic exchange platform 105. An electronic exchange platform 105 can include computer-implemented trading exchange system (exchange) 140 (e.g., a trading engine to match trades), a gateway computer system 130 (e.g., to communicate with clients), and memory to store an order book (e.g., to store data messages received from clients). The order book may be stored in or part of exchange 140 (e.g., in electronic data storage of exchange 140). Other components and/or systems, such as those shown in FIG. 2, may also be included in electronic exchange platform 105.

Client systems 110 can be associated with an individual and/or business entity (e.g., a retail broker or an individual trader) that is conducting electronic trading with the electronic exchange platform 105. The electronic exchange platform 105 communicates with the plurality of client systems 110, by using electronic data messages, to receive and match order messages including order instructions.

Client systems 100 include a central processing unit (CPU), a memory, and a data transmission device. The data transmission device can be, for example, a network interface device which connects the client system to the network. The connection can be wired, optical, or wireless and can connect over a Wi-Fi network, the Internet (120A), or a cellular data service, for example. In certain examples, client systems 110 may have a dedicated connection 120B to the electronic exchange platform 105 (e.g., to gateway computer system 130 and/or exchange 140). The data transmission device can also be an input/output device that allows an example broker system to place the data on a computer-readable storage medium. The data transmission device is or includes, in some embodiments, a transceiver, baseband processor, network interface device, and/or other data communications circuitry, and is capable of sending and receiving data. Data may be received and/or transmitted by way of data packages or packets—e.g., electronic data messages.

The client systems 110 are used for interacting with the electronic exchange platform 105. For example, the client system can be used for creating electronic data messages relating to the placement of orders for buying or selling securities and transmitting said electronic data messages to the electronic exchange platform 105. The client system can take an order from a user to buy or sell a certain number of shares for a particular stock and send the order the electronic exchange platform 105. The electronic exchange platform 105 can attempt to match, route (e.g., by using a routing strategy), or otherwise handle the received order.

Exchange 140, gateway computer system 130, and clearing house computer system 150 may include a processing system (e.g., that includes one or more central processing units), memory, and a data transmission device. In example embodiments, these systems may include multiple processors and/or memories and may be designed for fail-safe redundancy. The data transmission device is or includes, in some embodiments, a transceiver, baseband processor, network interface device, and/or other data communications circuitry, and can connect the electronic exchange platform 105 to the network, send, and receive data. An order book exists in the memory of the exchange system (e.g., exchange 140 or another system). Exchange 140 may include or be programmed to automatically match incoming orders to those orders stored in the order book. The combination of software and hardware (or only hardware) may be referred to as a matching engine (e.g., described in connection with FIG. 3 below).

It will be appreciated that exchange 140, gateway computer system 130, and/or clearing house computer system 150, may be comprised of one or more computing systems. In other words, these systems may be physically separate computing systems, may be included in a single computer system, or may be implemented using a cloud computing platform. In certain examples, electronic exchange platform 105 is a private (e.g., not open to the general public) exchange that handles so-called dark pool liquidity.

The electronic exchange platform receives a data message that includes a data transaction request from a client system and attempts to find a match for that data transaction request. If the data transaction request is not successfully matched, the exchange stores the data transaction request in a list of pending data transaction requests in memory. In certain example embodiments, the electronic exchange platform can perform partial matches for data transaction requests. In certain example embodiments, a data transaction request includes or is an order. The order may include an instruction to buy or sell a particular instrument handled by the electronic exchange platform.

FIG. 2

FIG. 2 is another block diagram of a non-limiting example automated, computer-implemented trading system of FIG. 1. Here, client systems (e.g., trader terminals) 110 are used for issuing electronic order data messages to electronic exchange platform 105. Electronic order data messages are received at gateway 130 and processed by exchange 140. Entry gateway 130 connects with exchange 140 on a dedicated network and forwards received electronic order data messages to exchange 140 and further usually broadcast updates back to the trader terminals 110. It should, however, be understood that information being communicated to and from exchange 140 and the trader terminals 110 may be communicated via a single communication path.

While the trading terminals 110 are illustrated as trading terminals that traditionally are associated with manual input of market actions, the trading terminals 110 can also be implemented as algorithmic trading units, sometimes termed automatic order generators, having manual input for control of the algorithmic trading unit. The algorithmic trading unit is pre-programmed with instructions to automatically generate sell and buy orders and quotes (or changes/cancellations thereof) in response to input data (e.g., such as, for example, NASDAQ's TotalView market data feed) received from exchange 140. The trading terminals 110 also represent market makers inputting quotes to exchange 140. An electronic data message relating to the placement of an order received by the electronic exchange (e.g., an order or quote) typically includes various attributes, such as an indication whether to buy/sell an instrument, a limit price/market price, a quantity, and/or an indication of an account. Other values or attributes may also be included like an MAQ value (e.g., the minimum acceptable quantity that this order is to be matched against) or a MES value (the minimum execution size that is allowed for this order), or a counter party order's size value.

Exchange 140 includes or communicates with an associated computer-implemented clearing house 150 that includes one or more computers for maintaining account records, clearing executed trades, and reporting the same. The computer-implemented clearing house 150 also communicates with an associated computer-implemented clearing entity 170 including one or more computers. It will be appreciated that other arrangements of trading nodes (exchange 140, clearing house 150, etc. . . . ) may be employed when an electronic exchange platform 105 is implemented.

Matching Engine—FIG. 3

FIG. 3 shows an example computing system 300 that includes a matching engine 302 and order book 304. Computing system 300 may be implemented as part of exchange 140 or as exchange 140.

Example client system 308 transmits an electronic data message 312 that includes a data transaction request for a corresponding order (e.g., a data transaction request to match the order to a pending, or future, order). Electronic data message 312 may include and/or specify a clientID that identifies the client sending the request, a transaction type ID that may identify, for example, whether the request is associated with a sell or buy instruction (e.g., a transaction type identifier, such as, for example 0 for buy and 1 for sell), a typeID that may identify a particular instrument (e.g., a ticker symbol), a quantity value that indicates how much is to be traded by the exchange, a MinOrder value that indicates a minimum order amount that this order can be matched against, and a price value that indicates a particular price for the data transaction request. The MinOrder value may be an MAQ quantity or an MES quantity. Alternatively, or in addition, the MinOrder value may be a counter-party orders size (CPOS) or a counter size requirement value.

When the network interface 306A (which may be network interface 518 in FIG. 5) receives the electronic data message 312, the network interface 306A verifies the integrity of the electronic data message 312 and then relays the received electronic data message (or contents thereof) on to matching engine 302.

Matching engine 302 may be software that is executed on one or more hardware processors (e.g., processors of processing system 502) that are programmed or configured through the software. In certain examples, the matching engine 302 is implemented by one or more ASICs or other specific hardware.

Upon receiving a data transaction request, the matching engine 302 determines the type of data transaction request (e.g., whether a buy order or a sell order). Responsive to this determination, matching engine 302 accesses order book 304 and attempts to match the incoming order to an order that is pending in the order book. In certain examples, the data transaction request or order may or may not be added to the order book 304 when the matching process is triggered (see FIG. 4).

In certain examples, the order book 304 is stored in cache memory to allow for fast access to data messages contained in the order book. In certain examples, order book 304 is stored in random access memory (e.g., volatile memory) of computing system 300. In certain examples, the order book 304 stores multiple lists of electronic data messages or orders (e.g., a list of buy orders and a list of sell orders). The lists may be stored in a sorted order (e.g., price/time ordering or any other ordering technique). In certain examples, order book 304 is stored in non-volatile memory (e.g., a hard drive or solid state drive). In certain examples, portions of order book 304 are stored in different types of storage (e.g., some in cache, some in RAM, and some in non-volatile storage). In certain example embodiments, electronic data messages in order book 304 are sorted by order size. In the example shown in FIG. 3, order book 304 is divided into two sides (side x and side y, which may be buy and sell sides) that are each sorted by size. Accordingly, "Order m" in FIG. 3 is at the "top" of order book 304 on side x (e.g., the largest quantity order on side x). Typically, "Order m" will be filled before other smaller quantity orders (e.g., "Order a" in FIG. 3).

Upon accessing data messages in the order book 304, the matching engine attempts to match the incoming order (e.g., the "new order" in FIG. 3 on side x) with one of the data messages in the order book 304 (an existing order on side y). If no match is found, then matching engine 302 stores the incoming order to the order book 304.

However, if a match is made, then the matching engine 302 communicates the details of the match to clearing house systems 310 (or other computing nodes) via network interface 306B (e.g., which also may be network interface 518).

One example matching process operates as follows: Sort pending orders based on order size. In response to receiving a new order, iterate over the contra-side orders and skip past orders with a MAQ greater than the incoming order size. Match the incoming order to the first pending order. Continue matching pending orders to the incoming order (e.g., to fulfill its order size) until there are no more orders or no quantity left to fulfill for the incoming order is exhausted. Check if any of the matched orders satisfy the MAQ of the incoming order. If the MAQ of the incoming order was fulfilled, publish all matches, otherwise discard all matches and add the incoming order to the order book.

The following are examples of certain matching processes that fail to make trades because exact matches are not available.

TABLE 1

| Incoming Sell Order (140, MAQ = 140) | |
|---|---|
| Pending Buy Orders | Pending Sell Orders |
| 160, MAQ = 160 | |
| 120, MAQ = 120 | |
| 100, MAQ = 100 | |
| 50, MAQ = 50 | |
| 30, MAQ = 30 | |
| 10, MAQ = 10 | |

Here (as shown in Table 1), there are 6 orders pending in the order book. Each of the orders has a corresponding MAQ that is the size of the order. In other words, these pending orders will only be matched against other orders that have a quantity greater than or equal to the MAQ. Accordingly, if a new sell order is received for 140 that has a corresponding MAQ of 140, no matches will be made. Specifically, the only pending buy order that could satisfy the incoming sell order would be the 160 order. However, this pending buy order has an MAQ of 160, which the incoming sell order cannot satisfy. Similarly, while the incoming sell order could satisfy the other buy orders, those buy orders cannot satisfy the incoming sell order. Thus, no match is found and the incoming sell order is added to the order book on the sell side.

TABLE 2

| Incoming Sell Order (4) | |
|---|---|
| Pending Buy Orders | Pending Sell Orders |
| 10, MAQ = 10 | 5 |
| 10, MAQ = 6 | |

Here (as shown in Table 2), an incoming order of 4 (with no MAQ) cannot satisfy any of the buy orders, so it is added to the order book.

TABLE 3

| Incoming Sell Order (5, MAQ = 5) | |
|---|---|
| Pending Buy Orders | Pending Sell Orders |
| 10, MAQ = 10 | 6, MAQ = 6 |

Here (as shown in Table 3), an incoming order of 5 (with MAQ=5) cannot satisfy any of the buy orders, so it is added to the order book.

TABLE 4

| Incoming Sell Order (1) | |
|---|---|
| Pending Buy Orders | Pending Sell Orders |
| 10, MAQ = 10 | |

Here (as shown in Table 4), an incoming order of 1 (with no MAQ) cannot satisfy any of the buy orders, so it is added to the order book.

The following is another example, matching process that may be executed by the matching engine 302 when attempting to match an order to orders in the order book 304. This process is different from the previously-described process in that, according to this process, matches are made even when exact matches are not present but without violating minimum quantity restrictions and without having to solve complex combinatorial optimization problems:

1) Add an incoming order to the order book;
2) Iterate over aggressive side, set AGGRESSIVE_ORDER=top order;
3) Sum up all the quantity on the aggressive side=AGGRESSIVE_QUANTITY from the AGGRESSIVE_ORDER and down;
4) Iterate over passive side but skip all orders with MAQ>AGGRESSIVE_QUANTITY;
5) Sum up all the quantity on the passive side=PASSIVE_QUANTITY. If the AGGRESSIVE_ORDERs MAQ>PASSIVE_QUANTITY go to 3) but set AGGRESSIVE_ORDER to the next order; and
6) Match orders and quit.

In certain example embodiments, if an order is skipped in the above step 4 it may be removed from a list of potential orders on the passive side as there may be no need to revisit that order (in subsequent iterations of a given matching process) again when the next aggressive order is used. In other words, as the aggressive orders are sorted in descending order according to their respective quantities, orders that are too large for one iteration will be similarly too large for future iterations when the next aggressive order is selected. Similar adjustments to the matching process may be implemented where, for example, it can be determined that orders of no potential further use are removed from future iterations of the matching process.

FIG. 4

FIG. 4 is a flow chart of an example matching process that may be implemented according to certain example embodiments. For example, the matching process of FIG. 4 may be implemented as part of matching engine 302 or be a computer process that is executed by processing system 502. In step 400 a new order is received from a client system. As described herein, an order may be encapsulated in an electronic data message sent over a network to the electronic exchange system. For example, the electronic data message may be electronic data message 312 from FIG. 3 that includes data fields that make up the "order" discussed in connection with the process of FIG. 4.

In step 402, the newly received order is added to an order book maintained by the electronic exchange system. In step 404, the side of the order book that the new order is added to is set as the aggressive side for the matching process. For example (referring to FIG. 3), reception of "New Order" would result in the aggressive side being set to "Side x." The aggressive side may also be a working side. In certain example embodiments, the working side is determined to be the non-aggressive or passive side (e.g., the side opposite the newly received order). Thus, the steps and descriptions herein that apply to the aggressive side may be applied to the working side and the steps and descriptions here that apply to a passive side may instead apply to a non-working side.

In step 406, the top order on the aggressive side of the order book is set as a working order (x). This is the order that is going to be a basis for the initially matching process. As the order book is sorted according to order size, the order on the aggressive side with the highest quantity may be selected.

In step 408, the sum of all orders in the order book from the working order to the bottom order (e.g. the order with the least quantity) is calculated.

In step 410, the process switches over to the passive side of the order book (e.g., Side y continuing with the above reference to FIG. 3), but skips over orders that have a counter-party order size (CPOS), which may be a counter-size value, that is greater than the sum calculated in step 408. Excluding those orders that were skipped in step 410, a sum of the quantity of the remaining orders on the passive side is calculated in step 412.

In step 414, the process determines whether the CPOS of the working order is greater than the quantity sum of the passive orders (excluding the orders that were skipped).

If the answer to step 414 is "Yes", then the process proceeds to step 416, and the working order is set to the next order in the order book on the aggressive side and steps 408-414 are repeated. In certain examples, the order with the next highest order quantity is selected as the working order. It will be appreciated that multiple orders may have the same quantity and accordingly the next order selected via step 414 may not necessarily have a lower order quantity than the current order. Steps 408-416 may be included or part of a match eligibility process (e.g., a sub-process that is part of the matching process described in FIG. 4) that is used to determine if there is a possible match for the working order.

If, the answer to step 414 is "No," (i.e., the CPOS of the working order is less than or equal to the sum calculated in step 412), then the process proceeds to step 418 and the orders are matched.

In certain example embodiments, the matching of orders proceeds by fulfilling orders with preference being given to orders with larger sizes. In certain examples, this matching process is absolute such that if an order has even 1 more in terms of size it will be fully match before any of the lesser sized orders are matched. Thus, the qualifying orders are matched in decreasing order size (the age of the order being a tiebreaker). The example from table 9 illustrates this aspect. In other words, the other may be matched on a quantity-time basis.

In certain examples, other matching techniques may be used for the qualifying orders. For example, once a potential match has been identified the priority for filling orders may be time based.

The following are some examples of how the process described in connection with FIG. 4 may operate.

TABLE 5

| Pending Buy Orders | Pending Sell Orders |
| --- | --- |
| 160, CPOS = 160 | 140, CPOS = 140 (Incoming) |
| 120, CPOS = 120 | |
| 100, CPOS = 100 | |
| 50, CPOS = 50 | |
| 30, CPOS = 30 | |
| 10, CPOS = 10 | |

Here (as shown in Table 5), upon reception of incoming sell order, the order is added to the pending sell orders and the sell side is set to the aggressive side. The process would then sum the aggressive side and skip the 160 buy order because the sum of the aggressive side is only 140 and could not fill a counter party size of 160. However, as the CPOS of the working order is less than (or equal) to the sum of the passive side, the matching engine proceeds to match orders. In certain examples, the matching engine starts with the largest order and fulfills the orders based on size. Accordingly, the order of 120 is matched in full and the order of 100 is partially matched, leaving the rest of the partially matched order (80) in the order book. It will be appreciated that the 100 order is partially matched (20) because the counter party order size was greater than 100. In other words, when determining whether a match can be made the process looks at the size of the counter party order as opposed to the amount that could be matched for an individual order.

In the above example, since the orders are sorted on size for the matching process, orders with higher priority will protect orders below them from liquidity fishing (e.g., pings) by clients. If a client tries to fish they would need to submit a big enough order that could be executed. In other words, once we find a match on the passive side we are guaranteed we can match everything downward. There can be no orders with a CPOS greater than what was already executed. For example, if an order book has 120 and 100 sized orders (with equivalent CPOSes) and a match is found, the 100 size order "knows" that in order for it to be matched there must be a counter party order size of at least 100—even if only 10 is matched to the 100 (due the 120 being matched first).

In other words, an incoming order is not immediately set as the working order, but rather the largest order on the aggressive side is set to the working order. Smaller orders may not be guaranteed that their order will be acted upon for the matching process triggered by the order submission.

In certain examples, when an order is partially matched the corresponding CPOS for that order may be adjusted to the order size if the CPOS is greater than the new size for the order. Thus, in the above example, the CPOS value for the previous 100 sized order is set to 80 upon completion of the match.

TABLE 6

| Pending Buy Orders | Pending Sell Orders |
| --- | --- |
| 10, CPOS = 10 | 5 |
| 10, CPOS = 6 | 4 (Incoming) |

Here (as shown in Table 6), the incoming order is added to the order book and the resulting quantity on the aggressive side is 9. This 9 is the aggressive quantity that is to be matched against the passive side. The first order 10 CPOS=10 is too large (10>9) and will not be matched and is skipped. The next order, 10 CPOS=6, is matched leaving a remainder of 1 in the order book (e.g., 1, CPOS 1).

TABLE 7

| Pending Buy Orders | Pending Sell Orders |
| --- | --- |
| 10, CPOS = 10 | 6, CPOS = 6 |
| | 5, CPOS = 5 (Incoming) |

Here (as shown in Table 7), the incoming order is added to the order book and the aggressive side is summed to 11. 11 is then matched against the passive side of the order book. A size 11 order satisfies the first order, 10 CPOS=10, and is matched. The incoming order with CPOS=5 is partially matched because the order with more quantity (6) was fully matched before the 5, CPOS=5 was matched. Accordingly, after the matching process, table 7 will only have one sell order for 1, CPOS=1.

TABLE 8

| Pending Buy Orders | Pending Sell Orders |
| --- | --- |
| 10, CPOS = 10 | 1 (incoming) |

Here (as shown in Table 8), the incoming order of 1 is not matched and is simply added to the order book.

TABLE 9

| Pending Buy Orders (Passive) | Pending Sell Orders (Aggressive) |
| --- | --- |
| 5000, CPOS = 5000 | 1000, CPOS = 1000 |
| 100, CPOS = 100 | 75, CPOS = 75 |
| 10, CPOS = 10 | 12, CPOS = 12 |
| 1, CPOS = 1 | 6, CPOS = 6 (Incoming) |
|  | 3, CPOS = 3 |
|  | 3, CPOS = 3 |

Here (as shown in Table 9), a new sell order of 6, CPOS=6 is received and the aggressive side is set to the sell order side of the order book.

Following the steps in FIG. 4, the top order on the aggressive side (1000, CPOS=1000) is set as the working order and the sum of the aggressive side is calculated (1000+75+12+6+3+3=1099). The first order on the passive side is skipped because the CPOS is greater than 1099. Conversely, the remaining total quantity of the passive side is less than the CPOS of the working order and accordingly the next order is selected (step 416) as the working order.

Now the aggressive quantity is 99 and the first two orders on the passive side are skipped because their respective CPOSes are greater than 99. The remaining quantity (11) is less than the CPOS of the working order (75) and the next order on the aggressive side is set as the working order (12, CPOS=12). This working order is also not able to be matched and accordingly the next order is set as the working order.

With the working order being 6, CPOS=6, the total quantity on the aggressive side is 12. The first two orders on the passive side are skipped leaving a remaining quantity of 11. As the CPOS of 6 (the working order) is less than 11 a match can be performed.

When matching the orders, the 6 fulfills part of the 10, the first 3 fulfills part of the 10, and 2 of the remaining 3 fulfills 1 from the 10 and the 1. The lower priority 3 is then adjusted to 1, CPOS=1. Thus, the 6, 3, and 3 orders on the sell side are matched with the 10 and 1 orders on the buy side with 1 remaining sell order.

In certain examples, the price set for a match between the buy and sell orders in an order book is set at a midpoint price that is based on a "lit" order book (e.g., a publically available price point). In certain examples, the price is not included in the ranking of orders. Further, in certain examples, orders with a limit price attached to them (e.g., that is less generous than the midpoint price) may be ignored by the example matching processes described herein.

While certain examples embodiments have been described in connection with certain types of electronic trading systems (e.g., dark pools), it will be appreciated that the matching techniques discussed herein may be applied to other types of trading or matching systems. For example, the matching techniques described herein may be employed on a public electronic exchange where knowledge of the amount of liquidity for an order is more visible or publically known.

FIG. 5

FIG. 5 is a block diagram of an exemplary computing system 500 (which may also be referred to, for example, as a "computing device" or a "computer system according to some embodiments) according to certain example embodiments (e.g., one that is used when implementing an exchange). Computing system 500 includes a processing system 502 with CPU 1, CPU 2, CPU 3, CPU 4, a system bus 504 that communicates with RAM 506, and storage 508. The storage 508 can be magnetic, flash based (e.g., for a mobile client device), solid state, or other storage technology. The system bus 504 communicates with user input adapter 510 (e.g., PS/2, USB interface, or the like) that allows users in input commands to computing system 500 via a user input device 512 (e.g., a keyboard, mouse, touch panel, or the like). The results of the processing may be displayed to a user on a display 516 (e.g., an LCD) via display interface 514 (e.g., a video card or the like).

The computing system 500 may also include a network interface 518 (e.g., a transceiver) to facilitate wired (e.g., Ethernet—802.3x) and/or wireless communication (WiFi/802.11x protocols, cellular technology, and the like) with external systems 522 and/or databases 520. Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

External systems 522 may include other processing systems, systems that provide third party services, etc. Here, external systems 522 may be client devices or server systems. For example, an example server system may include a computer system that hosts a clearing house computer system.

External systems 522 may also include network attached storage (NAS) to hold large amounts of data. External systems, along with the internal storage and memory, may form a storage system for storing and maintaining information (e.g., order book information, routing strategies, etc). Such a system may communicate with users and/or other computing systems that process electronic order data messages. The database 520 may include relational, object orientated, or other types of databases for storing information (e.g., order book information for a financial instrument).

In other words, the processes, techniques, and the like, described herein (for client devices, server, and/or controller systems) may be implemented on a computing system. Such implementations may then configure or program the processing system to carry out aspects according to certain example embodiments. It will be appreciated that other architecture types may be used. For example, a single CPU may be used instead of multiple CPUS. Alternatively a processing system may include multiple CPU "cores." Further, the various elements shown in connection with FIG. 5 may be included into one cohesive physical structure (e.g., such as a tablet device).

The computing system may be arranged, in various embodiments, in many different ways. As just one example, the computing system may be arranged such that processors include: a multi (or single)-core processor; a first network interface device (which implements, for example, WiFi, Bluetooth, NFC, etc. . . . ); a second network interface device that implements one or more cellular communication technologies (e.g., 3G, 4G LTE, CDMA, etc. . . . ); memory or storage devices (e.g., RAM, flash memory, or a hard disk).

The processor, the first network interface device, the second network interface device, and the memory devices may be integrated as part of the same SOC (e.g., one integrated circuit chip or a "system-on-chip"). As another example, the computing system may be arranged such that: the processors include two, three, four, five, or more multi-core processors; the network interface devices include a first network interface device that implements Ethernet and a second network interface device that implements WiFi and/or Bluetooth; and the memory devices include a RAM and a flash memory or hard disk.

As described herein when a software module or software process performs any action, the action is in actuality performed by underlying hardware elements according to the instructions that comprise the software module. In various embodiments, each or any combination of the matching engine 302, order book 304, clearinghouse system 310, client system 308, client systems 110, electronic exchange platform 105, gateway computer system 130, exchange 140, etc. . . . , each of which will be referred to individually for clarity as a "component" for the remainder of this paragraph, are implemented using an example of the computing system 500 of FIG. 5. In such embodiments, the following applies for each component: (a) the elements of the 500 computing system 500 shown in FIG. 5 (i.e., the one or more processors 502, one or more memory devices 506 or 508, one or more network interface devices 518, one or more display interfaces 514, and one or more user input adapters 510), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 506 and/or 508 (e.g., in various embodiments, in a volatile memory device such as a RAM, in an instruction register, and/or in a non-volatile memory device such as a flash memory or hard disk) and all actions described herein as performed by the software modules are performed by the processors 502 in conjunction with, as appropriate, the other elements in and/or connected to the computing system 500 (i.e., the network interface devices 518, display interfaces 514, user input adapters 510, and/or display device 516); (c) alternatively or additionally, to the extent it is described herein that the component processes and/or otherwise handles data, in some embodiments, such data is stored in the memory devices (e.g., in some embodiments, in a volatile memory device such as a RAM and/or in a non-volatile memory device such as a flash memory or hard disk) and/or is processed/handled by the processors 502 in conjunction, as appropriate, the other elements in and/or connected to the computing system 500 (e.g., the network interface devices 518, display interfaces 508, user input adapters 510, and/or display device 516); (d) alternatively or additionally, in some embodiments, memory devices store instructions that, when executed by the processors 502, cause the processors 502 to perform, in conjunction with, as appropriate, the other elements in and/or connected to the computing system 500, each or any combination of actions described herein as performed by the component and/or by any software modules described herein as included within the component.

Technical Advantages of Described Subject Matter

In certain example embodiments, the subject matter described herein provides for faster and/or more efficient use of computing resources to determine if and/or how constraint bound electronic data messages in a first list of items may be matched against data messages (which may be similarly constrained) in another list. The technique may calculate the sum of values from one of the lists and use this to determine if a match is possible.

In certain example embodiments, an exchange computing system may find potential matches between counterparty orders more quickly and/or efficiently when used with orders that are bound by hidden constraints (e.g., such as MAQ). The techniques herein may provide efficiency gains by decreasing the search space in an algorithmic manner when performing the matching process.

In one conventional exchange environment, data fields of each electronic data message (message) may be publically viewable to all other participants and the computer systems controlled by those participants. But in certain instances, some (or all) of a message may be "hidden" from other participants. This may be an option so that the message is only matched against certain types of other messages.

But even when the properties of some messages are hidden, third parties may be able "ping" the opposing list of messages in an attempt to find out if there are messages with hidden values (or hidden electronic data messages). One potential solution to this problem is to implement minimum requirements on the data fields of the incoming data message. For example, if messages are being matched based on a size field of each message, then a minimum size check may be implemented for each of the messages that is being matched. If the minimum amount is not satisfied then the incoming message will only match against other "visible" messages and not against the hidden messages or attributes thereof.

While this type of solution may solve one problem (at least to some degree), other problems may be created. For example, if the process for matching messages in the two lists takes these extra considerations into account it may slow down the overall matching process being performed. It will be appreciated that optimizing a solution for these extra considerations is a non-deterministic polynomial combinatorial problem. Such complexities may make conventional solutions disadvantageous in environments where matches must be determined quickly. In certain instances, short cuts can be taken to reduce the time for determining a match. However, short cuts may miss potential matches. Accordingly, the technology described herein may be used to address and/or overcome such problems.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Applications of Described Subject Matter

Although process steps, algorithms or the like, including without limitation with reference to FIG. 4, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The following is a non-limiting example program according to certain example embodiments.

```
package com.nasdaq.norse.test;
import java.util.Comparator;
import java.util.Iterator;
import java.util.Random;
import java.util.Scanner;
import java.util.SortedSet;
import java.util.TreeSet;
/**
 * Teams up orders and matches them using a new minimum quantity (counter party order size)
algorithm.
 *
 * @author Simon Zonabend
 *
 */
public class CounterpartyOrderSizeAlgorithm2 {
    static final byte BID = 'B';
    static final byte ASK = 'S';
    static class Order {
        static int time = 0;
        public Order(byte side, int qty, int cpos) {
            this.qty = qty;
            this.originalQuantity = qty;
            this.cpos = cpos;
            this.side = side;
            this.timestamp = time++;
        }
        int originalQuantity;
        int timestamp;
        int qty;
        int cpos;
        byte side;
        @Override
        public String toString( ) {
            return (char)side + " " + qty + " CPOS=" + cpos;
        }
        public void decrease(int matchSize) {
            qty -= matchSize;
            if(cpos > qty) {
                cpos = qty;
            }
        }
```

```
        }
        Comparator<Order> comp = new Comparator<Order>( ) {
            @Override
            public int compare(Order o1, Order o2) {
                int qty = o2.originalQuantity - o1.originalQuantity;
                if(qty == 0) {
                    int time = (int)(o1.timestamp - o2.timestamp);
                    if(time == 0) {
                        return o1.hashCode( ) - o2.hashCode( );
                    }
                    return time;
                }
                return qty;
            }
        };
        SortedSet<Order> bids = new TreeSet<Order>(comp);
        SortedSet<Order> asks = new TreeSet<Order>(comp);
        SortedSet<Order> matchedOrdersSet = new TreeSet<Order>(comp);
        private void help( ) {
            System.out.println("q = quit");
            System.out.println("ENTER = randomize an order");
            System.out.println("B 100 CPOS=30 = Enter Buy 100 with CPOS=30");
            System.out.println("S 100 CPOS=30 = Enter Sell 100 with CPOS=30\n");
        }
        public CounterpartyOrderSizeAlgorithm2( ) {
            Random random = new Random( );
            help( );
            Scanner sc = new Scanner(System.in);
            while(true) {
                String bString = sc.nextLine( ).trim( );
                int qty = 0;
                int cpos = 0;
                byte side = 0;
                if(bString.startsWith("q")) {
                    break;
                } else if(bString.isEmpty( )) {
                    qty = random.nextInt(100) + 1;
                    cpos = random.nextInt(qty) + 1;
                    side = random.nextInt(2) == 1 ? BID : ASK;
                } else {
                    try {
                        String[ ] splits = bString.split(" |=");
                        if(splits.length >= 4) {
                            side = (byte)splits[0].charAt(0);
                            qty = Integer.parseInt(splits[1]);
                            cpos = Integer.parseInt(splits[3]);
                        }
                    }
                    finally {
                        if(side != BID && side != ASK || cpos > qty || qty == 0 || cpos == 0) {
                            System.out.println("INVALID order!! try again");
                            continue;
                        }
                    }
                }
                Order o = new Order(side, qty, cpos);
                System.out.println("ADDING " + o);
                addOrder(o);
            }
        }
        private void addOrder(Order o) {
            if(o.cpos > o.qty) {
                throw new RuntimeException("Wrong CPOS! " + o);
            }
            SortedSet<Order> aggressiveSet = o.side == BID ? bids : asks;
            SortedSet<Order> passiveSet = o.side == BID ? asks : bids;
            aggressiveSet.add(o);
            printBook( );
            match(aggressiveSet, o, passiveSet);
        }
        private void printBook( ) {
            StringBuffer sb = new StringBuffer( );
            Iterator<Order> bidIter = bids.iterator( );
            Iterator<Order> askIter = asks.iterator( );
            sb.append("--- BUY ---   | --- SELL ---\n");
            if(!bidIter.hasNext( ) && !askIter.hasNext( )) {
                sb.append("Empty Book");
            }
```

```
            while(bidIter.hasNext( ) || askIter.hasNext( )) {
                if(bidIter.hasNext( )) {
                    sb.append(String.format("%-16s", bidIter.next( )));
                } else {
                    sb.append(String.format("%-16s", ""));
                }
                sb.append(" | ");
                if(askIter.hasNext( )) {
                    sb.append(String.format("%-16s", askIter.next( )));
                } else {
                    sb.append(String.format("%-16s", ""));
                }
                sb.append("\n");
            }
            System.out.println(sb.toString( ));
        }
        private void match(SortedSet<Order> aggressiveSet, Order o, SortedSet<Order> passiveSet) {
            boolean quit = false;
            Iterator<Order> aggIter = aggressiveSet.iterator( );
            while(aggIter.hasNext( ) && !quit) {
                Order aggStartOrder = aggIter.next( );
                SortedSet<Order> aggStartSet = aggressiveSet.tailSet(aggStartOrder);
                int aggressiveQuantity = getAggregatedQuantity(aggStartSet);
                boolean matched = matchPassiveSide(aggressiveQuantity, aggStartSet, passiveSet);
                quit = matched || aggStartOrder == o;
            }
        }
        private boolean matchPassiveSide(int aggressiveQuantity, SortedSet<Order> aggStartSet, SortedSet<Order> passiveSet) {
            boolean didMatch = false;
            Iterator<Order> aggStartIter = aggStartSet.iterator( );
            Order aggStartOrder = aggStartIter.next( );
            Iterator<Order> passiveIter = passiveSet.iterator( );
            while(passiveIter.hasNext( )) {
                Order passiveOrder = passiveIter.next( );
                if(passiveOrder.cpos > aggressiveQuantity) {
                    // Passive orders CPOS prevents match, we must skip this one.
                    continue;
                }
                long passiveQuantity = getAggregatedQuantity(passiveSet.tailSet(passiveOrder));
                if(aggStartOrder.cpos > passiveQuantity) {
                    // Aggressive orders CPOS prevents match
                    break;
                } else {
                    // MATCH!
                    matchedOrdersSet.clear( );
                    while(passiveOrder != null && aggStartOrder != null) {
                        int matchSize = Math.min(aggStartOrder.qty, passiveOrder.qty);
                        System.out.println("aggressiveQty = " + aggressiveQuantity + " MATCH:" + matchSize + " (" + aggStartOrder + " <-> " + passiveOrder + ") ");
                        didMatch = true;
                        passiveOrder.decrease(matchSize);
                        aggStartOrder.decrease(matchSize);
                        matchedOrdersSet.add(passiveOrder);
                        matchedOrdersSet.add(aggStartOrder);
                        if(passiveOrder.qty == 0) {
                            passiveOrder = passiveIter.hasNext( ) ? passiveIter.next( ) : null;
                        }
                        if(aggStartOrder.qty == 0) {
                            aggStartOrder = aggStartIter.hasNext( ) ? aggStartIter.next( ) : null;
                        }
                    }
                    // We need to remove the matched orders from BOOK and resort the partially matched.
                    for(Order order : matchedOrdersSet) {
                        SortedSet<Order> set = (order.side == BID) ? bids : asks;
                        if(!set.remove(order)) {
                            System.err.println("FAILED to remove " + order);
                        } else if(order.qty > 0) {
                            order.originalQuantity = order.qty;
                            set.add(order);
```

```
                }
            }
            printBook( );
            break;
        }
    }
    return didMatch;
}
private int getAggregatedQuantity(SortedSet<Order> sortedSet)
{
    Iterator<Order> startIter = sortedSet.iterator( );
    int total Size = 0;
    while(startIter.hasNext( )) {
        Order agg = startIter.next( );
        totalSize += agg.qty;
    }
    return totalSize;
}
public static void main (String [ ] s) {
    CounterpartyOrderSizeAlgorithm2 test = new
CounterpartyOrderSizeAlgorithm2( );
    }
}
```

The invention claimed is:

1. A computer system comprising:
a memory configured to store a first and second list of data transaction requests as, respectively, a first plurality of data transaction requests for the first list and a second plurality of data transaction requests for the second list, each of the plurality of data transaction requests being associated with a size value and a counter-size requirement value, wherein the first and second lists are contra to each other;
a transceiver configured to receive an electronic data message, wherein the electronic data message includes a first data transaction request with at least a first size value and a first counter-size requirement value, and a transaction type identifier that corresponds to the first or second plurality of data transaction requests;
a processing system that includes at least one processor coupled to the memory and the transceiver, the processing system configured to:
 add the first data transaction request to either the first list or the second list of the plurality of data transaction requests based on the transaction type identifier;
 set the first list or the second list as a working side based on which side the first data transaction request was added to and set the other of the first and second list as a non-working side;
 determine, from among the plurality of data transaction requests on the working side, a working data transaction request;
 for the working data transaction request, perform a match eligibility process that includes:
  a calculation, based on the working data transaction request, of a first sum of the size values of data transaction requests on the working side,
  a calculation of a second sum of the size values of the plurality of data transaction requests on the non-working side that each have a counter-size requirement value that is less than or equal to the calculated first sum, and
  a determination of whether the counter-size requirement value of the working data transaction request is less than or equal to the calculated second sum;
  based on the determination that the counter-size requirement value of the working data transaction request is less than or equal to the second sum, match a quantity the working data transaction request to a corresponding quantity of at least one of the non-working side data transaction requests.

2. The computer system of claim 1, wherein the working data transaction request is determined based on the size value of the plurality of data transaction requests on the working side.

3. The computer system of claim 1, wherein the working data transaction request is first determined to be one of the plurality of data transaction requests on the working side that has a size value that is the highest among the plurality of data transaction requests on the working side.

4. The computer system of claim 1, wherein the first sum is a sum of all data transaction requests on the working side that have size values that are less than or equal to the size value of the working order.

5. The computer system of claim 1, wherein the first sum includes a sum of all data transaction requests on the working side that are lower priority in the corresponding list than the working data transaction request.

6. The computer system of claim 1, wherein the processing system is further configured to:
responsive to the determination that the counter-size requirement value of the working data transaction request is greater than the second sum, set the working data transaction request to a different one of the plurality of data transaction requests on the working side and repeat the match eligibility process for different one of the plurality of data transaction requests.

7. The computer system of claim 6, wherein the different one of the plurality of data transaction requests is set based on having a next highest priority on the working side.

8. The computer system of claim 1, wherein multiple ones of the plurality of data transaction requests on the non-working side are matched against the working data transaction request.

9. A method of matching electronically received data transaction requests by a computer system that includes electronic memory, a transceiver, and a processing system that includes at least one processor coupled to the electronic memory and the transceiver, the method comprising:

(a) storing a first and second list of data transaction requests as, respectively, a first plurality of data transaction requests for the first list and a second plurality of data transaction requests for the second list, each of the plurality of data transaction requests including a size value and a counter-size requirement value;

(b) receiving an electronic data message that includes a first data transaction request with at least a first size value and a first counter-size requirement value, the electronic data message including a transaction type identifier that corresponds to the first or second plurality of data transaction requests;

(c) adding the first data transaction request to either the first list or the second list of the plurality of data transaction requests based on the transaction type identifier;

(d) setting the first list or the second list as a working side based on which side the first data transaction request was added to and set the other of the first and second list as a non-working side;

(e) determining, from among the plurality of data transaction requests on the working side, a working data transaction request;

(f) calculating, based on the working data transaction request, a first sum of the size values of data transaction requests on the working side;

(g) calculating a second sum of the size values of the plurality of data transaction requests on the non-working side that each have a counter-size requirement value that is less than or equal to the calculated first sum;

(h) determining if the counter-size requirement value of the working data transaction request is less than or equal to the calculated second sum;

(i) based on determination that the counter-size requirement value of the working data transaction request is less than or equal to the second sum, matching a quantity value that is less than or equal to the size value of the working data transaction request to a corresponding quantity value that is less than or equal to the size value from at least one of the non-working side data transaction requests.

10. The method of claim 9, wherein the working data transaction request is determined based on the size value of the plurality of data transaction requests on the working side.

11. The method of claim 9, wherein the working data transaction request is first determined to be one of the plurality of data transaction requests on the working side that has a size value that is the highest among the plurality of data transaction requests on the working side.

12. The method of claim 9, wherein the first sum is a sum of all data transaction requests on the working side that have size values that are less than or equal to the size value of the working order.

13. The method of claim 9, wherein the first sum includes a sum of all data transaction requests on the working side that are lower priority in the corresponding list than the working data transaction request.

14. The method of claim 9, further comprising:
repeating elements (f), (g), and (h), where a different one of the plurality of data transaction requests on the working side is set to the working data transaction request.

15. The method of claim 14, wherein elements (a), (b), and (c) are repeated in response to a determination that the counter-size requirement value of the working data transaction request is greater than the second sum.

16. A non-transitory computer readable storage medium having stored thereon computer readable instructions for use with a computer system that includes at least one processor, electronic memory, and a transceiver, the electronic memory configured to store a first and second list of data transaction requests as, respectively, a first plurality of data transaction requests for the first list and a second plurality of data transaction requests for the second list, each of the plurality of data transaction requests including a size value and a counter-size requirement value, the stored computer readable instructions comprising instructions that cause the computer system to:

receiving an electronic data message that includes a first data transaction request with at least a first size value and a first counter-size requirement value, the electronic data message including a transaction type identifier that corresponds to the first or second plurality of data transaction requests;

add the first data transaction request to either the first list or the second list of the plurality of data transaction requests based on the transaction type identifier;

set the first list or the second list as a working side based on which side the first data transaction request was added to and set the other of the first and second list as a non-working side;

determine, from among the plurality of data transaction requests on the working side, a working data transaction request;

calculate, based on the working data transaction request, a first sum of the size values of data transaction requests on the working side;

calculate a second sum of the size values of the plurality of data transaction requests on the non-working side that each have a counter-size requirement value that is less than or equal to the calculated first sum;

determine if the counter-size requirement value of the working data transaction request is less than or equal to the calculated second sum;

based on determination that the counter-size requirement value of the working data transaction request is less than or equal to the second sum, perform a matching process that matches a quantity of the working data transaction request to a corresponding quantity of at least one of the non-working side data transaction requests.

17. The non-transitory computer readable storage medium of claim 16, wherein the working data transaction request is determined based on the size value of the plurality of data transaction requests on the working side.

18. The non-transitory computer readable storage medium of claim 16, wherein the working data transaction request is first determined to be one of the plurality of data transaction requests on the working side that has a size value that is the highest among the plurality of data transaction requests on the working side.

19. The non-transitory computer readable storage medium of claim 16, wherein the first sum is a sum of all data transaction requests on the working side that have size values that are less than or equal to the size value of the working order.

20. The non-transitory computer readable storage medium of claim 16, wherein the first sum includes a sum of all data transaction requests on the working side that are lower priority in the corresponding list than the working data transaction request.

* * * * *